April 28, 1931. H. A. CUMFER 1,802,879
PROCESS OF MAKING MULTIPLY BUILDING BOARD
Filed June 24, 1929
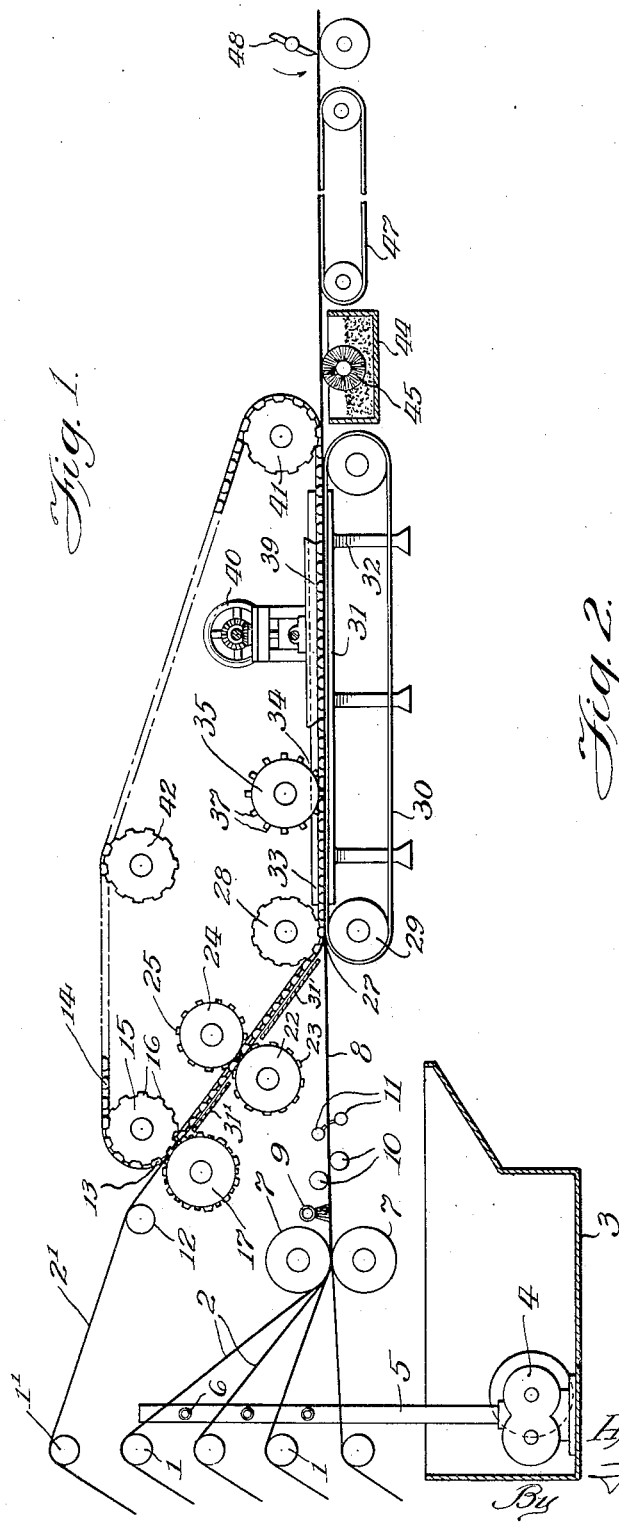
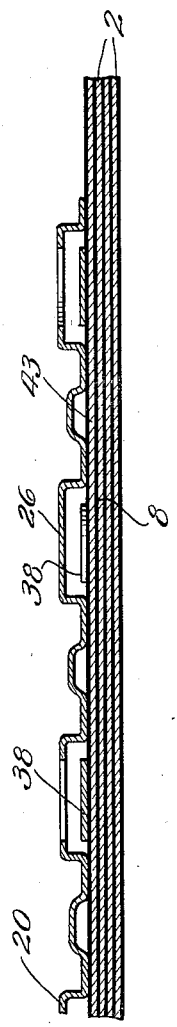
Inventor:
Harry A. Cumfer
Frank L. Belknap
By Atty Patented Apr. 28, 1931

1,802,879

UNITED STATES PATENT OFFICE

HARRY A. CUMFER, OF CHICAGO, ILLINOIS, ASSIGNOR OF ONE-HALF TO WILLARD J. MASON, OF GREENWICH, CONNECTICUT

PROCESS OF MAKING MULTIPLY BUILDING BOARD

Application filed June 24, 1929. Serial No. 373,091.

The present invention relates particularly to the manufacture of a multi-ply built-up building board for use particularly as a plaster board or plaster base, but designed broadly for use wherever it can be efficiently utilized as a building board.

The method to be described and claimed in this application is particularly adaptable in the manufacture of the product illustrated and claimed in my co-pending application, Serial No. 250,374, filed January 30, 1928.

In one specific embodiment of the present invention, a ply of relatively flexible fibrous material is fed to a corrugating means and corrugations made in said sheet while it is traveling in a plane disposed at an angle to the horizontal.

It is not essential that the corrugated sheet be fed at an angle to the horizontal, but inasmuch as, under most conditions, the corrugated sheet is more or less flexible, while the base sheet comprises a heavy relatively non-flexible sheet or plurality of laminated sheets, it is difficult to bend. Hence, I have found it desirable to feed the base sheet in a straight line and the corrugated sheet at an angle, joining the two in the plane of travel of the base sheet, the resulting composite sheet being carried forward in a straight line in the plane of travel of the base sheet.

Where the corrugated sheet is to be united with a base sheet and used as a plaster base, it is preferred that apertures be provided in the corrugated sheet, through which plaster may pass to be keyed therein. For this purpose, while the newly corrugated sheet is in registering relation with the corrugating elements which produced it so as to prevent flattening or spreading of the new corrugations, it is scored at spaced intervals.

The corrugated, scored sheet is then adhesively united with a flat base sheet and the composite multi-ply structure is carried forward from that point in a horizontal plane, care being taken that the corrugating elements are still in registering relation with the corrugated sheet to prevent flattening or spreading, until the adhesive has had sufficient time to set. During the travel of the composite sheet from the point where the corrugated and base sheets are adhesively united, the multi-ply sheet is acted on to completely sever tabs from the corrugated sheet along the lines of the scoring previously referred to, to provide plaster keying apertures in the corrugated sheet, and as a feature of the invention the cut-outs severed from the corrugated sheet are applied to and adhesively united with the upper adhesive surface of the base sheet.

The board is thereafter cut into suitable lengths and is ready to be bundled for use.

The advantages of the present invention, as well as a number of further features and objects thereof, will be more particularly apparent from the following description.

In the drawings, Fig. 1 is a cross sectional diagrammatic view illustrating the steps of the process; and Fig. 2 is an enlarged sectional view of the product produced by the process of the present invention.

Referring more in detail to the drawings, 1 indicates generally a plurality of guide rollers, over which strips or plies of fiber board of suitable weight and thickness are adapted to be fed. Strips 2 may be fed from rolls (not shown), mounted adjacent the front end of the machine proper. In the drawing I have illustrated the feeding of four strips, but the invention in its broadest aspects contemplates the use of one or any number of strips 2. A guide roller 1' is positioned above the guide rollers 1, adapted to guide the feeding of a separate ply or strip 2'.

It may be here explained that at the present time there is a heavy commercial demand for a building board comprising a laminated flat base sheet (built up by adhesively uniting a plurality of plies) adhesively united with a corrugated sheet, preferably a single ply. Therefore, I have illustrated in the diagrammatic showing in the drawing, the feeding of a plurality of sheets 2 for the formation of a laminated flat base sheet, and have illustrated only the feeding of a single ply 2′ for the formation of the corrugated sheet. It is to be understood, of course, that this is merely illustrative and that the process is equally applicable to the manufacture of a final product comprising any number of plies, either in the base sheet or the corrugated sheet, or both.

A tank 3 is disposed beneath the machine proper and adjacent the guide rolls 1 and 1′, the tank 3 being adapted to contain a waterproofing material having adhesive properties, such as heated asphalt or the like. A pump 4 may be mounted within the tank 3 to pump the adhesive waterproofing material through an upstanding conduit 5 provided with transversely positioned outlet pipes 6 disposed between the various plies 2, for the purpose of applying the adhesive waterproofing material to the surfaces of such strips. The strips 2 may then pass between a pair of co-acting pressure rolls 7, whereby the strips 2 are adhesively united to form a laminated board 8. Subsequently to leaving the rolls 7, the board 8 is subjected to a stream of similar adhesive waterproofing material delivered to the upper face thereof through a pipe 9. The pipe 9 may be connected to the conduit 5 in an obvious manner, or it may be supplied in any other suitable way with adhesive waterproofing material. The board 8 may then pass through a set of "doctor" rolls 10 whereby the adhesive waterproofing material is uniformly spread over the board surface. Scrapers 11 may remove excess waterproofing material from the surface of the board.

After being fed over the guide roller 1′, the strip 2′ may be further guided by a roller 12 into a corrugating unit designated as a whole 13. Unit 13 may comprise a bar chain 14. Chain 14 may travel over a cylinder 15 provided with a plurality of longitudinally disposed, spaced ribs 16. A sprocket chain (not shown) supports the bar chain 14 at each side thereof, said sprocket chain being adapted to travel over and drive a pair of sprocket wheels (not shown) positioned rigidly upon the shaft on which the cylinder 15 is mounted. A cylinder 17 is co-operatively associated with cylinder 15 and chain 14, the arrangement being such that cylinder 17 is constructed and timed so as to alternately present at the point of contact between the two cylinders a depression opposite to a rib and a rib opposite to a depression, thus forming the upper corrugated sheet 20. In order to prevent tearing or gouging of the corrugations when the two cylinders 15 and 17 mesh, sufficient clearance is provided between the various meshing ribs and depressions so that the sheet 2′ will not be cut therebetween. The amount of clearance thus provided is dependent upon the thickness of the sheet or sheets 2′. To prevent flattening or spreading of the newly formed corrugations in corrugated sheet 20, I use the bars of the chain 14 not only as the means for feeding the corrugated sheet forward but also as a means registering with the depressions in the corrugated sheet to maintain the shape of the corrugations.

The arrangement is such that the corrugated sheet is held in contact with the bars of the chain 14 by means of a platform 31′ positioned immediately below the path of travel of the chain 14 as it leaves the corrugating unit 13.

The corrugated sheet 20 passes from the corrugating means 13 to a scoring unit which, in the present instance, may comprise a scoring roll 22 provided with a plurality of circular scoring dies 23, and a bed roll 24 provided with longitudinal ribs 25, the arrangement being such that the scoring dies 23 are adapted to cut against bed roll 24, making an incision in the sheet at the top of the rectangular corrugations 26. The scoring dies may have circular cutting edges, but it is to be understood that complete severance does not take place at this step.

The corrugated, scored sheet 20 is carried from the scoring unit to a joining unit 27 at which point the corrugated, scored sheet is united with the base sheet 8. The joining unit 27 may comprise a sprocket wheel 28 adapted to register with the sprocket chain which carries the bar chain 14, functioning to hold the latter in contact with the board 8 which travels over a cylinder 29. A belt 30 may pass around cylinder 29, the speed of which is timed to the speed of the chain 14. A table 31 may be positioned beneath the belt 30, being adapted to slide upon the upper surface of table 31.

In order to prevent the bars of the bar chain 14 from breaking engagement with the corrugated sheet 20 when the same passes from the corrugating unit to the scoring unit and from the scoring unit to the joining unit, a track is provided parallel to the platform 31′ and on each side thereof, which is adapted to guide the aforementioned sprocket chains (not shown), thereby maintaining the travel of the bar chain 14 parallel to the platform 31′ and holding the same in engagement with the corrugated sheet 20.

It is to be noted that the upper surface of the base sheet 8 has a coating of adhesive waterproofing material applied thereto by means of the spray 9, so that when the corrugated sheet is brought into contact with the adhesive surface of the base sheet, the two sheets are adhesively united into a composite structure comprising an upper corrugated ply and a lower flat base ply. This unit is carried forward by the belt 30 and the bars of the chain 14, which latter are still in registering engagement with the depressions in the corrugated sheet to prevent flattening and spreading. Stationary plates 33 may be disposed above the bars of chain 14 for the purpose of maintaining a constant pressure thereon. The purpose of applying pressure at this point in the process is to prevent any slippage between the two sheets.

Subsequent to leaving the joining unit 27, the unit passes to a knockout unit 34 which may comprise a knockout roll 35. Knockout roll 35 may comprise a cylinder provided with a plurality of lugs or pins 37 appropriately spaced upon its periphery, being adapted to punch out the scored tabs 38 from the crests 26 of the corrugations along the scored lines, and in the same operation functioning to apply the cut tabs to the adhesive surface of the base sheet 8. Thus, these tabs are adhesively united to the base sheet immediately below the apertures formed by knocking them out.

Some of the advantages of this will be apparent to those skilled in this art. In practice, the outer surfaces of the corrugated sheet are preferably devoid of waterproofing material. Normally, the upper surface of the base sheet exposed below the apertures is coated with waterproofing material which is not miscible with the water in the plastic material passing through the apertures when the board is used as a plaster base. Therefore, it has been difficult to secure a bond between the plaster passing through the apertures and the base sheet. By the present invention, the upper surface of the pasted tab, being devoid of waterproofing material, will present a surface having an affinity for the plastic material and acting as an auxiliary key.

From this point, the chain 14 and composite board pass, subject to the pressure of the plate 33, a predetermined distance computed to be long enough to permit proper setting of the adhesive material. If additional pressure is desired, an additional plate 39, adjustable by the mechanism 40, may be provided.

When the board has been in contact with the bar chain a length of time computed to be sufficient for the two sheets to set, the contact is broken between the bar chain and the board, the bar chain doubling back over the ribbed cylinders 41 and 42. The time during which element 14 is in contact with the board is dependent upon the speed of the machine and will vary between the approximate limits of one-half minute to one and one-half minutes, more or less.

The board designated as a whole 43 may then pass over a box 44 in which is positioned a rotating brush 45 adapted to dust the bottom of the board 43 with talc or other finely divided clay-like material. The board may then pass to a conventional conveyor belt 47 which carries it to a conventional cutter 48, where the board may be cut into suitable lengths.

It is to be understood that the illustration in the drawing is purely diagrammatic. The concept of the present invention relates to a series of process steps whereby a good building board is produced. Various changes may be made to the structure without departing from the scope of the invention, just as long as the steps of the process are carried out.

I claim as my invention:

1. A process which comprises scoring a continuously advancing corrugated sheet at spaced intervals, uniting said corrugated, scored sheet with a base sheet, thereafter completely severing said scoring lines, removing the cut-outs thereby produced and uniting said severed cut-outs with the base sheet.

2. A process which comprises scoring a continuously advancing corrugated sheet at spaced intervals, uniting said corrugated, scored sheet with a base sheet, thereafter completely severing said scoring lines, removing the cut-outs thereby produced and uniting said severed cut-outs with the base sheet adjacent the apertures thus formed in the corrugated sheet.

3. A process which comprises acting on a continuously advancing fibrous sheet to produce alternate depressions and ribs therein, scoring said advancing sheet at spaced intervals, thereafter uniting said corrugated sheet with a continuously advancing base sheet, then completely severing said scoring lines and forcibly uniting the severed cut-outs thus produced with the base sheet.

4. A process which comprises acting on a continuously advancing fibrous sheet to produce alternate depressions and ribs therein, scoring said advancing sheet at spaced intervals, thereafter uniting under pressure said corrugated sheet with a continuously advancing base sheet, then completely severing said scoring lines and forcibly uniting the severed cut-outs thus produced with the base sheet immediately adjacent the apertures thus formed in the corrugated sheet.

5. A process which comprises forming alternate ribs and depressions in a continuously advancing fibrous sheet, scoring the surfaces of the ribs at spaced intervals, uniting under pressure the corrugated, scored sheet with a base sheet through the medium of an adhesive waterproofing material, positively maintaining the united plies in contact for a sufficient time to permit said adhesive to partially set, subsequently completely severing the scored portions from the corrugated sheet and adhesively uniting said severed cut-outs with the base sheet.

6. A process which comprises feeding in timed relation two continuous strips of fibrous material, forming one of the continuously advancing strips into a series of alternate ribs and depressions and producing partial incisions in the surfaces of the ribs, then adhesively uniting the second continuously advancing strip to the corrugated sheet under pressure to form a unitary structure comprising a flat base ply and a corrugated ply, then completely severing the partially incised portions from the ribs of the corrugated sheet and adhesively uniting each of the cut-outs thus produced with the base sheet immediately below the apertures thus formed in the ribs, and maintaining the united plies in contact under pressure for a time sufficient to permit said adhesive to partially set.

7. A process which comprises applying adhesive waterproofing material to a surface of a continuously advancing flat sheet, simultaneously forming alternate ribs and depressions in a second continuously advancing sheet and scoring the surfaces of the corrugated sheet at spaced intervals, then bringing the corrugated, scored sheet into contact with the flat sheet and adhesively uniting the two sheets under pressure through the medium of said adhesive waterproofing material, subsequently completely severing the scored portions from the corrugated sheet and uniting each of the cut-outs thus produced to the base sheet through the medium of said adhesive waterproofing material immediately below the respective apertures produced in the corrugated sheet.

8. A process comprising punching out tabs from the crests of a corrugated sheet and applying same to an adhesive surface of a base sheet adhesively united to said corrugated sheet.

9. A process comprising punching out tabs from the crests of a corrugated sheet and applying same by pressure to an adhesive surface of a base sheet adhesively united to said corrugated sheet.

10. A process which comprises applying pressure to the scored portions of a corrugated sheet to completely sever cut-outs or tabs defined by said scoring, and adhesively uniting said cut-outs to the surface of a base sheet adhesively united to said corrugated sheet.

11. A process which comprises applying pressure to the scored portions of a corrugated sheet to completely sever cut-outs or tabs defined by said scoring, and simultaneously adhesively uniting said cut-outs to the surface of a base sheet adhesively united to said corrugated sheet.

12. A process which comprises partially severing cut-outs from a continuously advancing corrugated sheet, uniting said corrugated sheet with a base sheet and completely severing said partially severed cut-outs, removing the cut-outs and uniting said completely severed cut-outs with the base sheet.

In testimony whereof I affix my signature.

HARRY A. CUMFER.